(12) United States Patent
Helgesen

(10) Patent No.: US 8,267,453 B1
(45) Date of Patent: Sep. 18, 2012

(54) ROTATABLE HARD COVER ROOF FOR A POP-OUT ON A TRAILER

(76) Inventor: Michael Helgesen, Simi Valley, CA (US)

( * ) Notice: Subject to any disclaimer, the term of this patent is extended or adjusted under 35 U.S.C. 154(b) by 236 days.

(21) Appl. No.: 12/798,388

(22) Filed: Apr. 1, 2010

(51) Int. Cl.
*B60P 3/34* (2006.01)

(52) U.S. Cl. .................................... 296/26.01

(58) Field of Classification Search ............ 296/26.01, 296/224, 107.08, 107.17, 171, 173, 175, 296/216.02, 219, 216.12, 163, 165, 168, 296/26.13; 135/88.1
See application file for complete search history.

(56) References Cited

U.S. PATENT DOCUMENTS

| | | | |
|---|---|---|---|
| 2,811,935 A * | 11/1957 | Jones | 52/11 |
| 2,909,220 A | 10/1959 | Zimmerman | |
| 3,286,404 A * | 11/1966 | Harrison | 49/384 |
| 3,800,484 A * | 4/1974 | Marshall | 52/69 |
| 4,077,419 A * | 3/1978 | Lux | 160/68 |
| 4,117,876 A * | 10/1978 | Bennett | 160/67 |
| 4,160,458 A * | 7/1979 | Marcellus | 160/67 |
| 4,170,378 A | 10/1979 | Jacobsen | |
| 4,198,998 A | 4/1980 | Duffy | |
| 4,848,386 A * | 7/1989 | Cooper | 135/90 |
| 5,280,687 A * | 1/1994 | Boiteau | 52/67 |
| 5,381,844 A | 1/1995 | Struben | |
| 5,566,918 A * | 10/1996 | Becker | 248/351 |
| 5,597,006 A * | 1/1997 | Simonetti | 135/88.1 |
| 5,752,556 A | 5/1998 | Steadman | |
| 6,048,016 A * | 4/2000 | Futrell et al. | 296/26.13 |
| 6,131,990 A * | 10/2000 | Crean | 296/163 |
| 6,260,909 B1 * | 7/2001 | Crean et al. | 296/163 |
| 6,598,612 B1 * | 7/2003 | Crowe | 135/88.12 |
| 6,695,388 B1 | 2/2004 | Thisdale | |
| 6,840,568 B2 * | 1/2005 | Carrillo et al. | 296/163 |
| 6,860,544 B2 * | 3/2005 | Malott | 296/175 |
| 7,055,890 B1 | 6/2006 | Crean | |
| 7,156,451 B2 * | 1/2007 | Verhelst | 296/163 |
| 7,234,760 B1 | 6/2007 | Crean | |
| 7,281,560 B2 * | 10/2007 | Hicks et al. | 160/80 |
| 7,798,197 B2 * | 9/2010 | Gutierrez | 160/67 |
| 7,967,050 B2 * | 6/2011 | Gutierrez | 160/67 |
| 2003/0094833 A1* | 5/2003 | Thompson et al. | 296/163 |
| 2006/0108819 A1* | 5/2006 | Wagner et al. | 296/26.01 |
| 2009/0056884 A1 | 3/2009 | Vogt | |

* cited by examiner

*Primary Examiner* — Kiran B Patel
(74) *Attorney, Agent, or Firm* — Thomas I. Rozsa

(57) ABSTRACT

A hard cover roof to cover the open top of a pop-out and is rotatably hingeably affixed to the roof of the trailer and slidably engaged with the pop-out through mating track mechanisms on the underside of the roof and the top exterior rear wall of the poop-out so that the roof track mechanism can slide relative to the track retaining mechanism of the pop-out so that it covers the top opening the pop-out is in the fully extended condition and rests over the exterior rear wall of the pop-out when the pop-out is in the retracted condition within the trailer.

3 Claims, 7 Drawing Sheets

ROTATABLE HARD COVER ROOF FOR A POP-OUT ON A TRAILER

BACKGROUND OF THE INVENTION

1. Field of the Invention

The field of the invention relates to the field of roof covers for what are known as pop-outs in trailers including cast trailers and mobile homes. A mobile home or cast trailer is basically a generally rectangular structure that has a given width and a given length. In order to improve the interior usable space, the construction also includes what is called a pop-out which is an interior room that is slidably placed within the mobile home or trailer while it is being transported from one location to another and then is slid out on rails so that the width of the trailer for usable interior space is expanded. Pop-outs can be one sided or there can be more than one pop-out on one side or there can be pop-outs on both sides of the trailer. The present invention relates to the field of providing roofs for the pop-outs after they are in there expanded position out of the trailer.

2. Detailed Description of the Prior Art

In general the concept of having some roofs for pop-outs is known in the prior art. The following 12 patents are relevant to the field of the present invention:

1. U.S. Pat. No. 2,811,935 issued to Howard G. Jones on Nov. 5, 1957 for "Fabricated Sheet Metal Trailer Awning" (hereafter the "Jones Patent");
2. U.S. Pat. No. 2,909,220 issued to Joseph E. Zimmerman on Oct. 20, 1959 for "House Trailer Awning" (hereafter the "Zimmerman Patent");
3. U.S. Pat. No. 3,286,404 issued to James K. Harrison on Nov. 22, 1966 for "Metal Awning With Adjustable Mounting Construction" (hereafter the "Harrison Patent");
4. U.S. Pat. No. 3,800,484 issued to Robert D. Marshall on Apr. 2, 1974 for "Awning For Travel Trailers And The Like" (hereafter the "Marshall Patent");
5. U.S. Pat. No. 4,170,378 issued to Gerald A. Jacobsen on Oct. 9, 1979 for "Combined Wind Deflector And Window Awning Assembly For Recreational Trailers" (hereafter the "Jacobsen Patent");
6. U.S. Pat. No. 4,198,998 issued to Donald D. Duffy on Apr. 22, 1980 for "Retractable Awning" (hereafter the "Duffy Patent");
7. U.S. Pat. No. 5,381,844 issued to Francis L. Struben on Jan. 17, 1995 for "Portable Two-Way Aluminum Awning For Recreational Vehicles" (hereafter the "Struben Patent");
8. U.S. Pat. No. 5,752,556 issued to William David Steadman on May 19, 1998 for "Support Arrangement" (hereafter the "Steadman Patent");
9. U.S. Pat. No. 6,695,388 issued to March Thisdale on Feb. 24, 2004 for "Awning Device, Kit and Method of Using" (hereafter the "Thisdale Patent");
10. U.S. Pat. No. 7,055,890 issued to Johnnie R. Crean on Jun. 6, 2006 for "Awning For Recreational Vehicles" (hereafter the "'890 Crean Patent");
11. U.S. Pat. No. 7,234,760 issued to Johnnie R. Crean on Jun. 26, 2007 for "Top-Mounted Awning Assembly For Recreational Vehicles" (hereafter the "'760 Crean Patent");
12. United States Published Patent Application No. 2009/0056884 to Jeffrey A. Vogt on Mar. 5, 2009 for "Wind Resistant Awning" (hereafter the "Vogt Published Patent Application").

The Jones Patent discloses a hard awning which extends from the trailer. The patent discloses an awning which can be disassembled and placed in the trailer for transportation and then fabricated and retained by a J-shaped member as best illustrated in FIG. 8 and retained by Pole C.

The Zimmerman Patent discloses a house trailer awning. The concept of this invention is that it provides an awning which can be folded and which is disposable when folded onto the top of a roof or trailer body so as to avoid taking up room within the body. The cover is intended to be stored on the roof of a trailer and does not have a covering of a roof for a pop-out.

The Harrison Patent discloses an awning with an adjustable mounting structure. The patent discloses the concept of having an awning which can be rotatable so that if we rotate it out and then support it on posts 18.

The Marshall Patent discloses an awning which can be rotated to be affixed to the side of a trailer and is supported by posts that provide shelter.

The Jacobsen Patent discloses a combination wind deflector and window awning assembly.

The Duffy Patent discloses a retractable awning which can rest against the side of a vehicle and then can be expanded as best shown in FIG. 1 to provide a shelter awning under which a person can stand.

The Struben Patent discloses a portable awning which discloses the following:

"The present invention is a portable two-way awning for use with recreational type trailer vehicles. The awning is comprised of a number of roof panels made with two sheets of aluminum surrounding a polystyrene core. A hanger mechanism is bonded to each of the panels, and suspends them on an adapter rail that slidingly engages with a standard awning attachment rail. The roof panels mate together via a number of interlocking members disposed on their mating sides. The outer periphery of the roof assembly is surrounded with a number of extrusion members. Once the roof assembly is pivoted to a nearly horizontal position, it is supported at its front end by a number of adjustable height poles, two of which swing freely into a vertical position when the roof is initially erected. The awning requires no tools or caulking to set-up, and takes less than thirty minutes to either erect or dismantle. The awning is relatively light in weight, yet strong enough to withstand the harshest of weather conditions."

The Steadman Patent discloses a support arrangement. Specifically, the patent discloses:

"A support arrangement (12) for mounting an awning or similar on a wall (14). The arrangement (12) includes a first elongate member (18) one end of which is pivotally mountable on the wall (14). The other end of the member (18) pivotally mounts a shorter second member (28). A third elongate member (32) is provided slidably mounted to the second member (28) and lockable to the first member (18) when in a parallel relationship therewith. The end of the member (32) away from the member (18) is pivotally mountable to an awning (10). By virtue of the respective sliding, pivoting and locking of the members (18,28,32), the arrangement (12) can adopt a collapsed position with the members (18,28,32) lying against each other such that the awning (10) can lie against the wall (14), or an erect condition with the members (18,28,32) in alignment and adjustable in length to provide for different inclinations of the awning (10)."

The Thisdale Patent discloses a hard cover for an awning but it is effectively supported by exterior posts 18. Specifically, the patent discloses:

"an awning for use as an auxiliary ran shield over a sleeping unit slidably attached to a recreational camping vehicle comprising two pairs of securing brackets attached to a bottom platform of the sleeping unit of the recreational camping vehicle; a pair of corner posts attached to said two pair of securing brackets, each corner post having a flattened distal end, a clip attached to a middle portion, a hooked proximate end, and an elbow in the middle portion; a generally rectangular sheet having a pair of adjacent corners attached to said hooked proximate ends of said pair of corner posts; a primary adhesive strip attached to an edge of said sheet; and a complementary adhesive strip attached to a portion of a roof of the recreational camping vehicle, said complementary adhesive strip is reversibly attached to said primary adhesive strip."

However, this is an inefficient way to retain the awning in the used and unused condition as a roof for a pop-out.

The '890 Crean Patent discloses the concept of creating an awning which can be positioned over the front window of a trailer.

The '760 Crean Patent is a continuation-in-part of the previously Crean Patent and has the same disclosure.

In general, in addition to the above prior arts, the present inventor is aware of the fact that in general pop-outs have the soft cover roof which is basically rolled out to cover the pop-out when it is in the extended condition. The problem with the soft cover roof is that leaves and other debris can easily fall on the cover and cause problems with the mechanism that enables the cover to be retracted when the pop-out is in the closed condition. In addition, the wind and other elements can cause the pop-out to blow and create openings in the roof where rain and other elements can get into the interior of the pop-out when it is in the extended condition. The roll up cover which unrolls and is placed over the pop-out to provide a ceiling has a problem with the flexible material rollout cover is that if it rains or there are leaves or they get dirty, it is very difficult to clean and the dirt and debris sometimes goes in the rollout mechanism and basically causes the mechanism to be ruined.

Therefore, there is a significant need for an improved cover for a pop-out which eliminates the problems, associated with the prior art rollout pop-outs and also eliminates the problems that are not addressed in the prior art patents.

SUMMARY OF THE INVENTION

The present invention relates to the field of roof covers for what are known as pop-outs in trailers including cast trailers or mobile homes. Specifically, a mobile home or cast trailer is basically a generally rectangular structure that has a given width and a given length. In order to improve the interior useable space, the construction also includes what is called a pop-out which is an interior room that is slidably placed within the mobile home or trailer while it is being transported from one location to another and then is slid out on rails so that the width of the trailer or useable interior space is expanded. Pop-outs can be on one side or there can be more than one pop-out on one side or pop-outs can be on both sides of the trailer and expand in opposite directions to increase the overall total width of the trailer from both sides.

The pop-outs have a rear wall, two side walls and a floor. The top of the pop-out is uncovered. The present state of the art is that there is a roll up cover which unrolls and is placed over the pop-out to provide a ceiling.

The present invention is a hinged hard cover which can open with the pop-out as it is being extended to the full width so that it is in the useable condition and is on a track so that it will remain as a cover and then can be released when it is necessary to roll or push the pop-out back into the space within the trailer when the trailer is going to be moved.

The present invention is a hard cover roof to cover the open top of a pop-out and is rotatably hingeably affixed to the roof of the trailer and slidably engaged with the pop-out through mating track mechanisms on the underside of the roof and the top exterior rear wall of the poop-out so that the roof track mechanism can slide relative to the track retaining mechanism of the pop-out so that it covers the top opening the pop-out is in the fully extended condition and rests over the exterior rear wall of the pop-out when the pop-out is in the retracted condition within the trailer.

It is an object of the present invention to provide a hinged hard cover which can open with the pop-out as it is being extended to the full width so that it is in the useable condition and is on a track so that it will remain as a cover and then can be released when it is necessary to roll or push the pop-out back into the space within the trailer when the trailer is going to be moved.

It is a further object of the present invention to provide a hard cover roof to cover the open top of a pop-out and is rotatably hingeably affixed to the roof of the trailer and slidably engaged with the pop-out through mating track mechanisms on the underside of the roof and the top exterior rear wall of the poop-out so that the roof track mechanism can slide relative to the track retaining mechanism of the pop-out so that it covers the top opening the pop-out is in the fully extended condition and rests over the exterior rear wall of the pop-out when the pop-out is in the retracted condition within the trailer.

It is to be understood that both the foregoing general description and the following detailed description are exemplary and explanatory only and are not restrictive of the invention as claimed The accompanying drawings which are incorporated in and constitutes a part of the specification, illustrate one embodiment of the invention and together with the description, serve to explain the principles of the invention.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
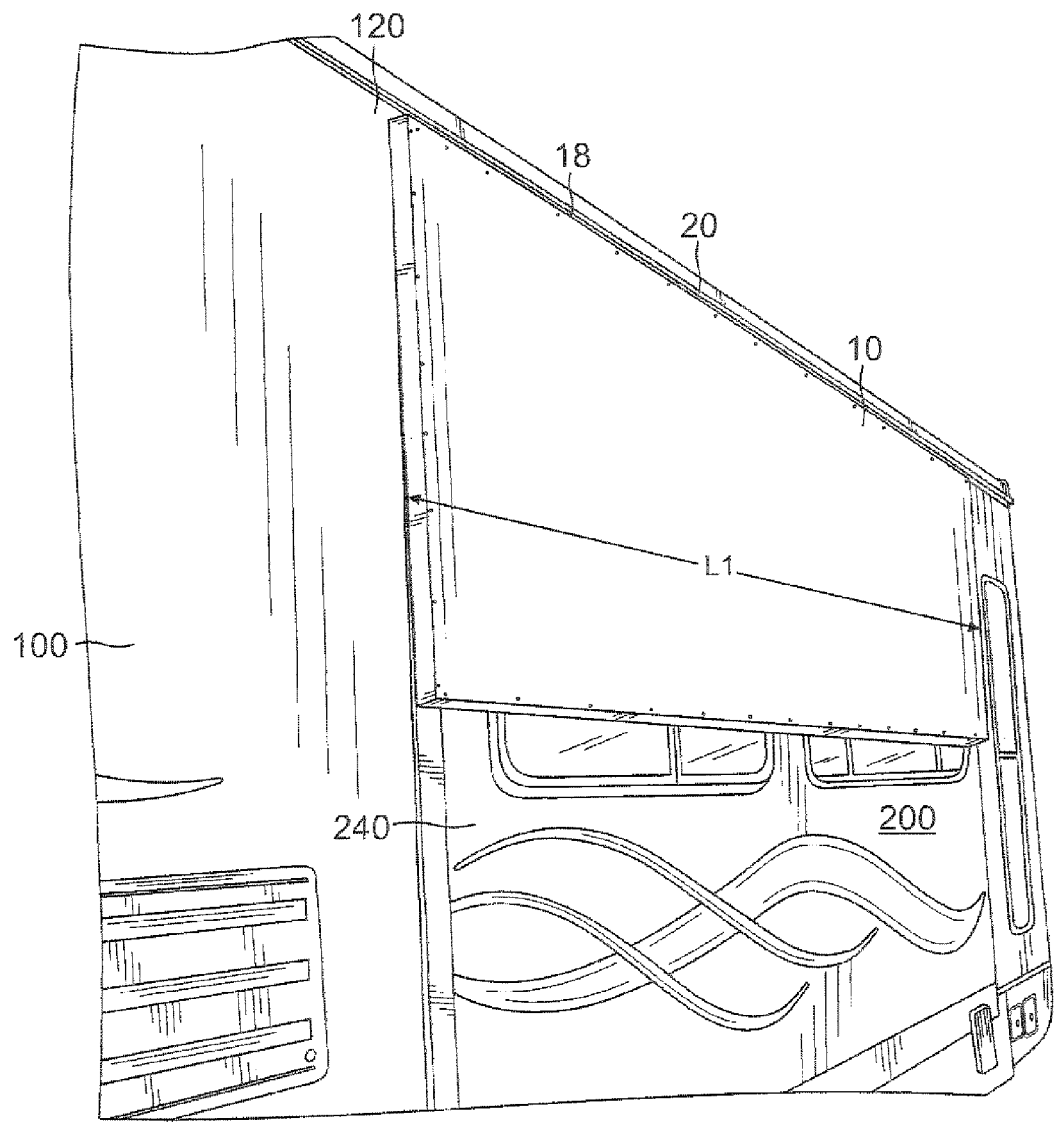
FIG. 1 is a perspective view of a section of a trailer with the pop-out in the fully retracted condition and the present invention roof resting over the exterior rear wall of the pop-out.
Figure 2:
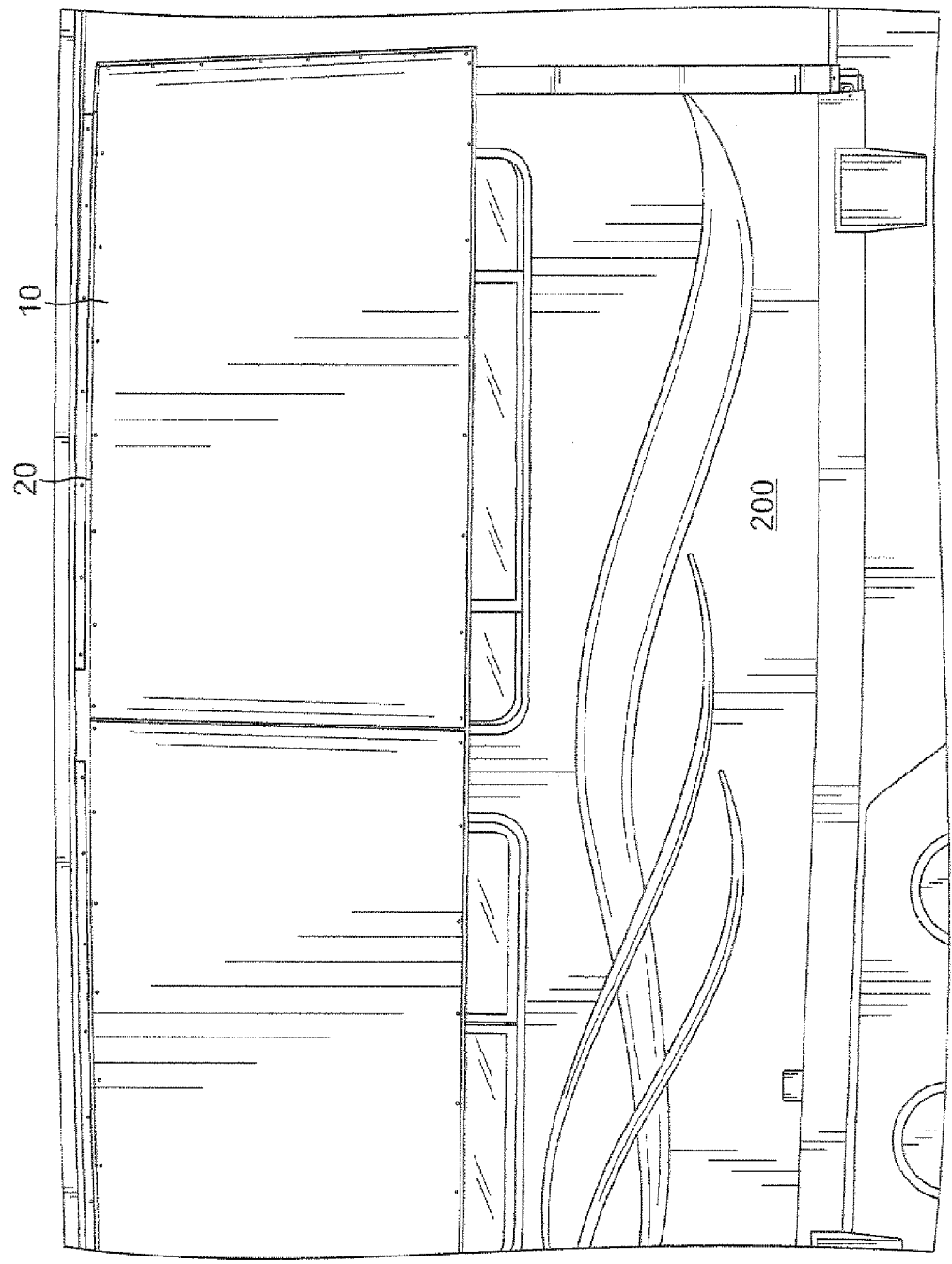
FIG. 2 is a rear elevational view of a section of a trailer with the pop-out in the fully retracted condition and the present invention roof resting over the exterior rear wall of the pop-out.
Figure 3:
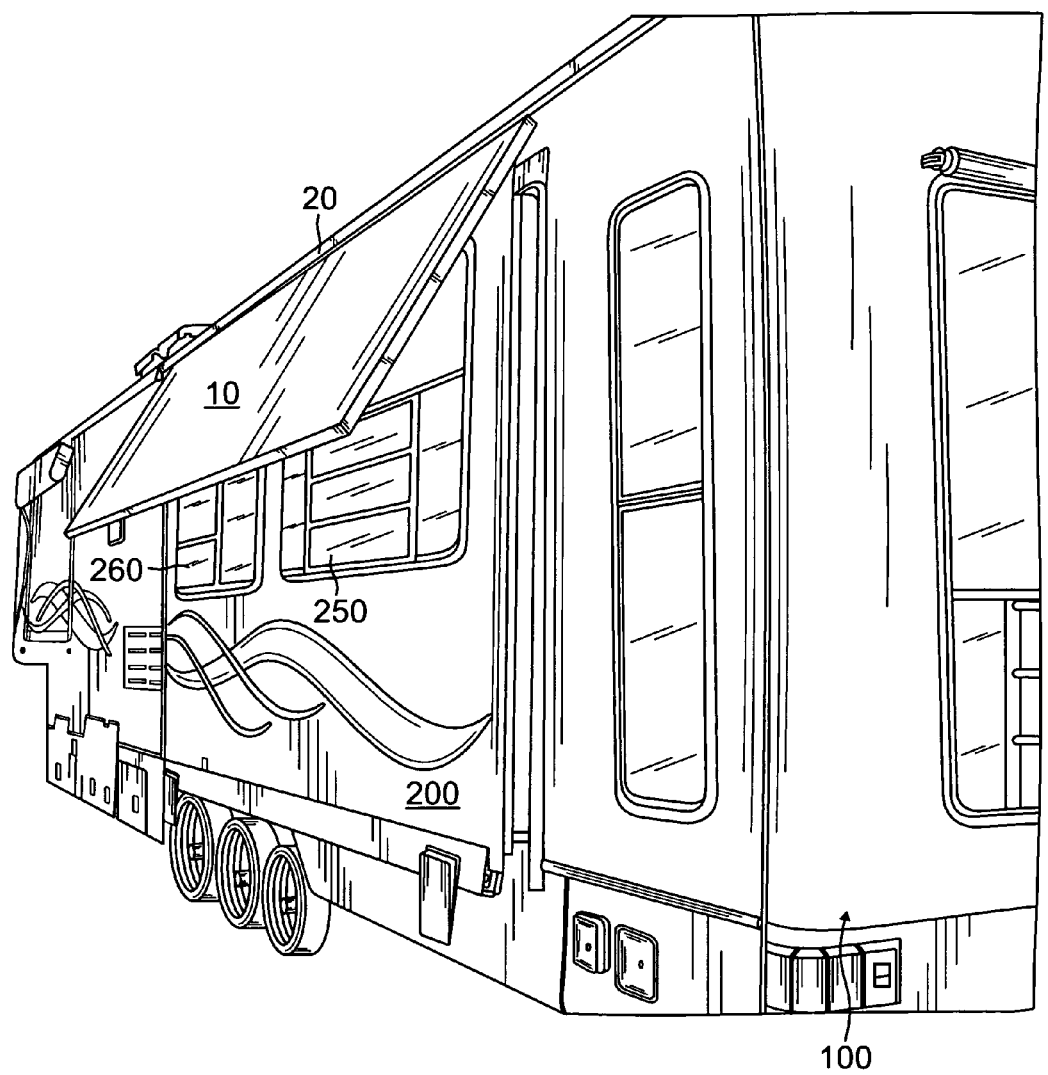
FIG. 3 is a perspective view of a section of a trailer with the pop-out partially extended out of the trailer condition and the present invention roof partially resting over the open top of the pop-out.
Figure 4:
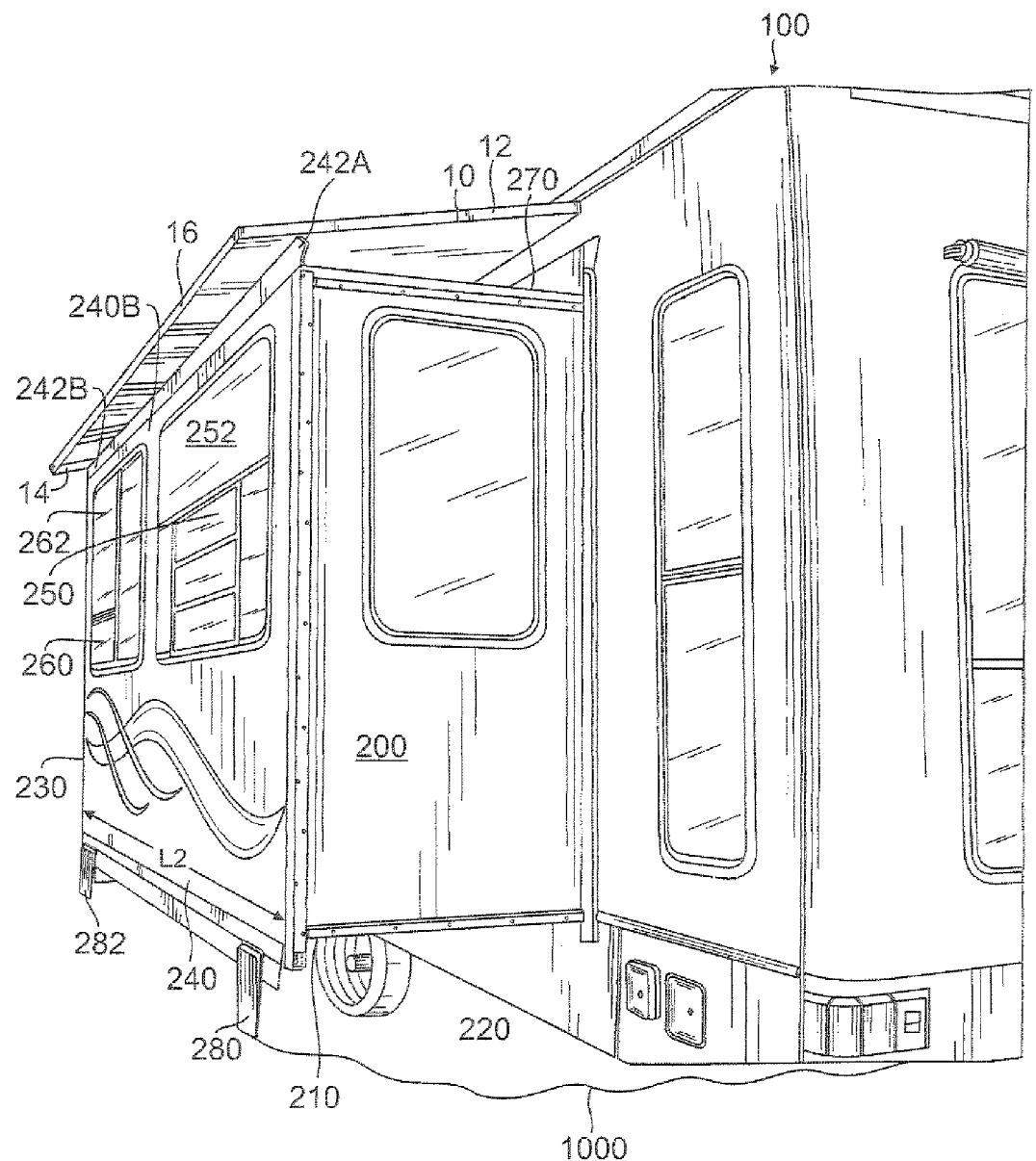
FIG. 4 is a perspective view of a section of a trailer with the pop-out in the fully extended condition out of the trailer and the present invention roof resting over the open top of the pop-out.

Referring to FIGS. 1 through 4, there is illustrated a portion of a trailer which includes at least one pop-out having the hard covering extendable slidable roof of the present invention. Specifically, the trailer is marked as 100 which includes a pop-out 200. In FIG. 1 the pop-out 200 is in the condition in which it is fully retracted within the trailer 100 with the present invention hard cover roof 10 hanging down over the rear side 240 of the pop-out 200 and affixed with a rotatable hinge means 20 to the roof 10 of the trailer or mobile home. The roof 10 is made out of hard material selected from the group consisting of polyvinyl, fiberglass, steel, aluminum, and fiberboard. The hinge means 20 is preferably affixed to the lower exterior portion 120 of roof 10 and to an interior longitudinal edge 18 of roof cover 10. Referring to FIG. 2, there is also illustrated a side view of the present invention, again, only including the side view of the pop-out 200, the present invention hard cover 10, and the hinge means 20 by which the cover is attached to the roof 10 of the pop-out. Referring to FIG. 3 there is illustrated the mechanism by which the hard cover starts to be rotated into place as the pop-out 200 is slid out of its place in a trailer 100 into its useable condition where it will be forming extra interior space. The present invention hard roof for a pop-out 10 is shown in its fully extended condition in FIG. 4. The pop-out 200 is now fully extended out of the trailer. The pop-out 200 has a lower floor, a first side wall 220, an opposite and parallel second side wall 230 and a rear exterior wall 240 with the interior of the pop-out extending into the interior of the trailer. The pop-out can also have optional windows 250 and 260 and window screens 252 and 262. These are conventional. The top of the pop-out 270 is open and exposed. When in the fully extended condition, rear supporting feet 280 and 282 extend from the rear exterior wall 240 to help support the pop-out 200 on the ground 1000. The present invention hard cover roof 10 is now shown in its extended condition over the pop-out top 270 so that it forms a hard cover roof. The roof 10 is conformed to the shape of the top opening 270 and is preferably rectangular in shape. Referring to FIGS. 1 through 4, the present invention is affixed to the roof 10 or upper side of the trailer 100 by a rotatable hinge means 20. The rotatable hinge means 20 enables the pop-out to rotate to a closed condition as shown in FIG. 1 when the pop-out is fully retracted back into the trailer and rotates in the counterclockwise direction to a fully extended condition resting over the open top 270 of the pop-out 200 as shown in FIG. 4.

Figure 5:
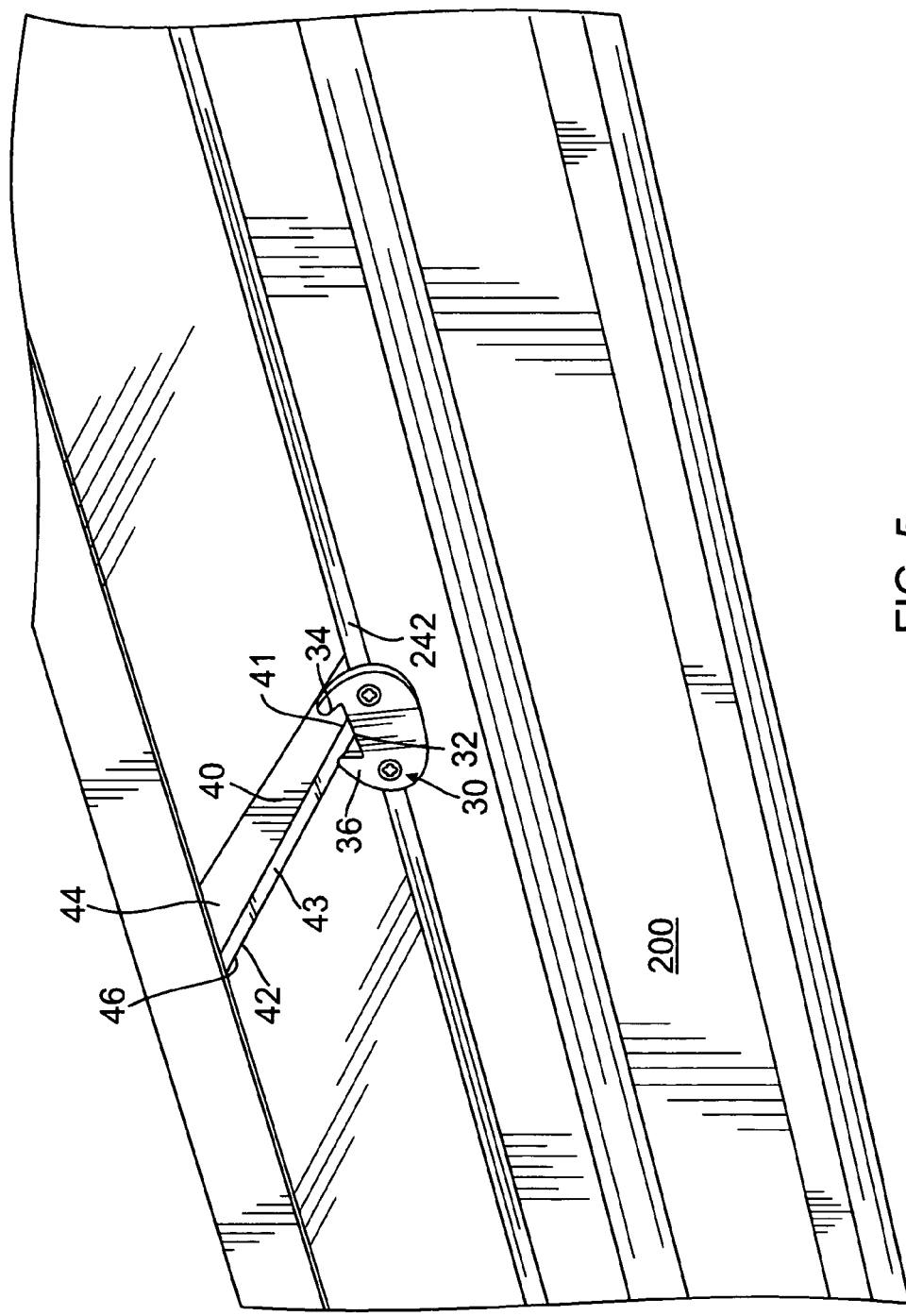
FIG. 5 is a perspective view of one embodiment of a track retaining mechanism set comprising a track mechanism on the underside of the roof and the mating track retaining mechanism at the top of the exterior rear wall of the pop-out.

The mechanism by which the pop-out can be rotated to its fully extended condition has one or two alternative variations to permit the pop-out to be retracted so that it extends concurrently as the pop-out is being pull out of the trailer into its in-use condition. Referring to FIG. 5, one embodiment is a general U-shaped track retaining mechanism 30 which is affixed to the exterior rear wall 240 at a location adjacent to the top 242 and which contains a gap 32 surrounded by oppositely disposed teeth mechanisms 34 and 36. These are aligned with an interior roof structure or track 40 which has a lower beam section 42 and oppositely disposed decreased width exterior side walls 44 and 46. The lower beam section 42 has oppositely disposed extending lips 41 and 43. The lower lips 41 and 43 it within gap 32 so that extending lip 41 is retained in the gap 32 by tooth mechanism 34 and extending lip 43 is retained in the gap 32 by extending tooth mechanism 36. While one such U-shaped retaining mechanism 30 and corresponding beam 40 is illustrated, it will be appreciated that a multiplicity of such retaining mechanisms are located at spaced apart locations along the length "L1" of the roof 10 and along the top of the length "L2" of the pop-out 200.

By way of example, such combination retaining mechanism can be located adjacent a first end 12 of roof 10 and adjacent the first edge 242A of top 242 of exterior rear wall 240 of pop-out 200 and adjacent a second end 14 of roof 10 and adjacent a second edge 242B of the top 242 of exterior rear wall 240. Additional such combination retaining mechanisms can be located at spaced apart locations from the first end 12 and first edge 242A to the second end 14 and second edge 242B, such as illustrated in FIG. 5. By way of example, the present invention can include a total of five (5) such retaining mechanism combinations. It is within the spirit and scope of the present invention for there to be at least one retaining mechanism combination 30 and 40.

Therefore, as the pop-out 200 is pulled out from its retracted condition to its fully extended condition, the roof cover 10 rotates about its hinge 20 and is cause to be extended over the pop-out ope top 270 by the track 40 sliding within the track retaining mechanism 30 until it is in its fully extended condition as shown in FIG. 4. Preferably, there are a multiplicity of such combination tracks and track retaining mechanisms along the length of the pop-out and length of the hard cover roof 10, such as five such combination track retaining mechanisms and tracks at equally spaced apart locations both on either ends of the roof and pop-out and then equally spaced along the exterior length of the roof and pop-out.

Figure 6:
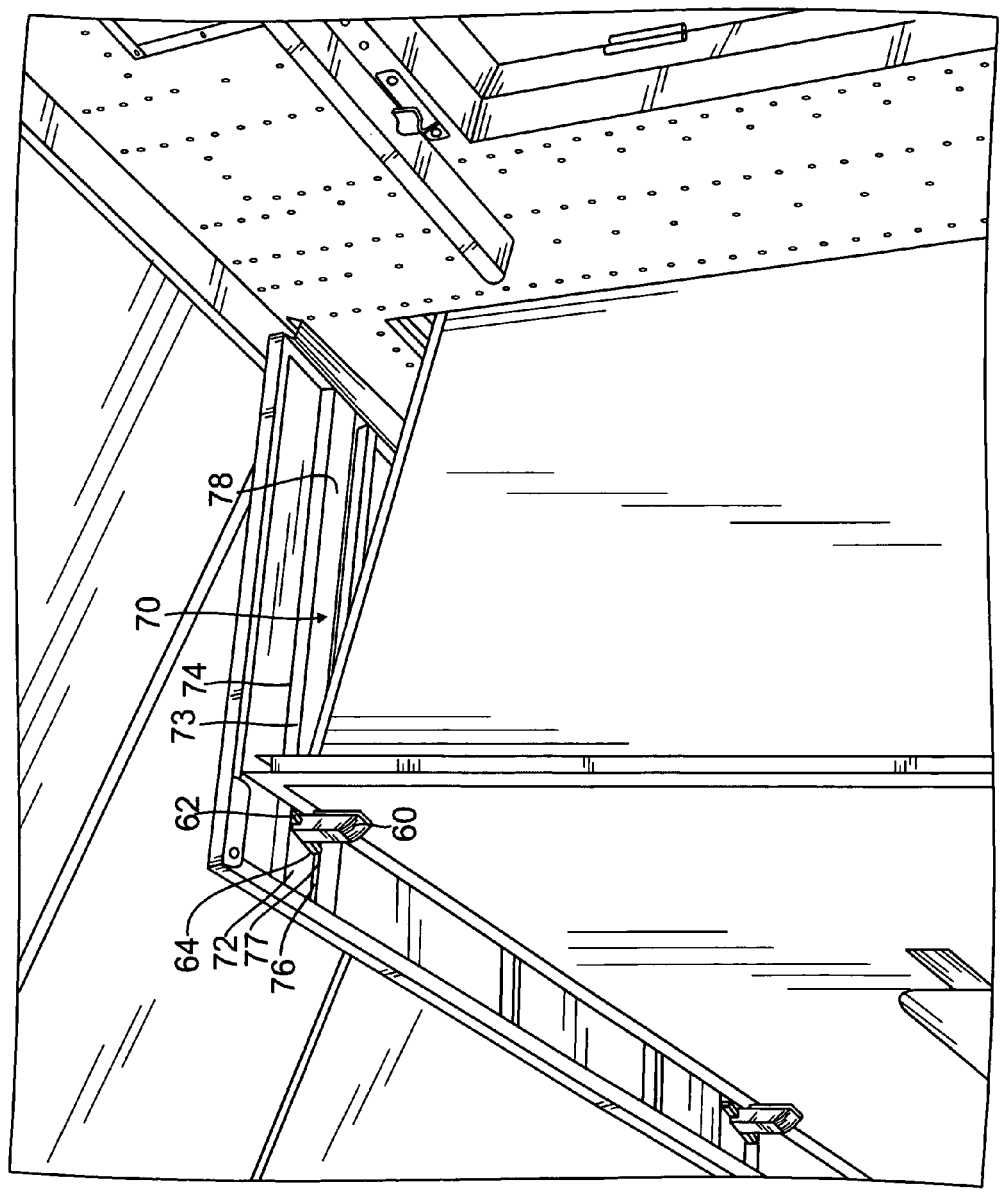
FIG. 6 is a perspective view of an alternative embodiment of a track retaining mechanism set comprising a track mechanism on the underside of the roof and the mating track retaining mechanism at the top of the exterior rear wall of the pop-out.

An alternative track retaining mechanism is illustrated in FIG. 6. In this alternative embodiment, the pop-out contains a vertical tooth member 60 having spaced apart flanges 62 and 64. In this case, the underside of the pop-out has a track member 70 comprising an interior horizontal wall 72 on the underside of the roof 10, a first transverse sidewall 74 with an interiorly extending lower wall 73, a parallel oppositely disposed second transverse sidewall 76 with an interior extending lower wall 77 all of which surround an interior gap 78. The tooth mechanism 60 from the pop-out slides within the track mechanism on the underside of the pop-out roof 10 within the interior gap 78 so that flange 62 is retained between horizontal wall 72, first transverse sidewall 74 and its interiorly extending lower wall 73 and flange 64 is retained between horizontal wall 72, second transverse sidewall 76 and its interior extending lower wall 77.

When the pop-out 200 is in the fully retracted condition, the mechanism enables the roof 10 to rest against the side of the pop-out 200 as shown in FIG. 1 and as the pop-out is moved to its fully extended condition, the roof 10 rotates about its hinge mechanism 20 and then the tooth mechanism 60 slides within the underside track mechanism 70 on the underside of the pop-out so that the roof will be retained over the open top 270 of the pop-out 200 when the pop-out is in the fully extended condition. As with the previous embodiment, there can be a tooth and track mechanism on either end of the pop-out and roof and multiple spaced apart such track mechanisms extending along the length of the roof and pop-out.

Figure 7:
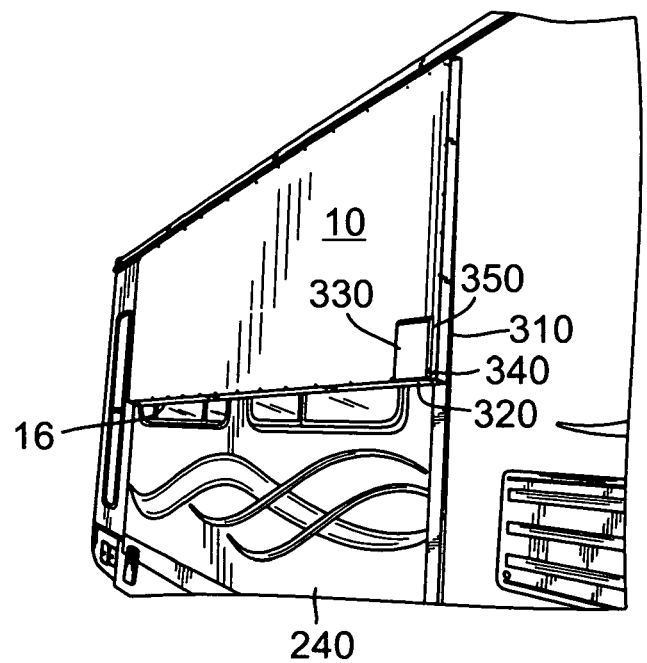
FIG. 7 is a perspective view of a C-channel affixed to the pop-out in the retracted condition with a portion of the roof within the C-channel.
Figure 8:
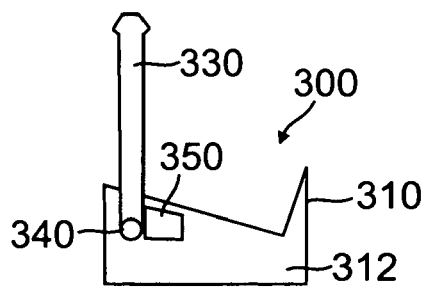
FIG. 8 is a side elevational view of the C-channel.
Figure 9:
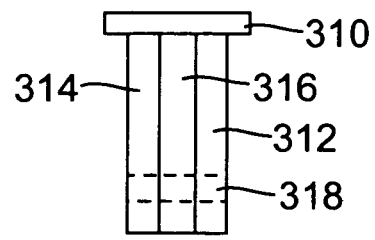
FIG. 9 is a top plan view of a portion of the C-channel.

As an additional further security mechanism, referring to FIGS. 7-9, the end of the pop-out contains an interior facing C-channel 300 having a vertical wall 310 affixed to the exterior wall 240 of the pop-out 200 and extending to a pair of transverse members 312 and 314 with a gap 316 between them. An opening 318 extends through both transverse walls. A vertical wall 330 is rotatably attached within gap 316 by pin 340 extending through openings 318 so that it can rotate in the clockwise or counterclockwise direction. The edge 16 of the roof 10 is retained by the vertical wall 330 which is spring adjusted by an internal spring means 350. The edge 16 of the roof 10 is retained by the vertical wall 330. The C-channel member 300 is preferably affixed adjacent one roof end such as 242A of exterior rear wall 240 of pop-out 200. When the pop-out is in the fully retracted condition as illustrated in FIG. 1, the C-channel member 300 appears as illustrated in FIG. 7 and serves to fully retain the roof 10 against the rear exterior wall 240 of pop-out 200 so that the roof 10 will not flip-and flap against the pop-out as the trailer 100 is be moved from one location to another. This provides additional retaining security to the roof 10 when not in use. When the pop-out is pulled out to its in-use condition, the outer vertical wall 330 rotates in the counterclockwise direction about pin 340 to permit the roof 10 to be extended above the open top 270 of the pop-out 200 as previously described. When the pop-out is retracted, then wall the spring-loaded wall 330 serves to retain the roof 270 against the pop-out 200 so that the trailer can be transported without the roof 10 flapping loosely.

Therefore, the significant improvement of the present invention is that the hard cover roof is affixed to the pop-out so that it will not fly away and provides a shield to cover the pop-out when it is in the extended condition. The hard cover roof is hingeably attached to the roof of the trainer. Specifically, the unique features of the present invention is that it has a sliding track mechanism on the underside of the roof and a mating track retaining mechanism on the top of the pop-out so that the hard cover roof 10 can rotate about the hinge retaining means which retained thereof to the top of the trainer as the pop-out is extended from its retracted condition to the fully extended condition and the track mechanism fully serves to retain the roof 10 over the extended pop-out 200 in the fully extended condition so that the roof will not fly away or be caused to expose the open top 270 of the pop-out 200 because it is securely retained by the mating track mechanism. The additional oppositely disposed C-channel mechanism on at least one side of the pop-out and preferably on opposite sides of the pop-out further provides additional security to assure that the hard cover roof will not flap against the pop=out when the roof is in its retracted condition.

Therefore, through use of the present invention, the problems of the soft cover pop-outs are eliminated. The hard cover roof can easily be cleaned of debris by having it hosed down and the hinge mechanism which is on the interior 120 of the roof 110 of trailer 100 and the interior lengthwise edge 18 of the roof and is therefore shielded from exterior elements so that the rotatable hinge mechanism will not be damaged.

Therefore through use of the present invention, the pop-out is kept in a safe and dry condition when it is in the extended position as the roof 10 rotates in the counterclockwise direction to cover the open top and the roof can be automatically retracted as the pop-out is retracted back into the trailer because the track mechanisms enable the roof to rotate in the clockwise direction as the pop-out is moved back into the trailer. Accordingly, it is not necessary to have any extra mechanism to affix or remove the pop-out because the pop-out automatically is retained on the roof and automatically moves to a retracted condition when the pop-out is within the trailer and the roof automatically moves to an extended condition when the pop-out is in its fully extended condition.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A roof (10) for use in conjunction with a pop-out (200) on a trailer (100), the trailer (100) having a body and an interior compartment (230) and the pop-out having a first sidewall (220), a second sidewall (230), an exterior rear wall (240), a floor (210) and a top opening (270), and movably extendable from a condition where it is retracted into the trailer (100) to a position where it is extended out of the trailer (100), the roof comprising:

a. the roof (10) conformed to the shape of the top opening (270) of the pop-out (200) and having at least an interior longitudinal edge (18);

b. the interior longitudinal edge (18) of the roof (10) rotatably affixed to the top of the trailer (100) by rotatable hinge means (20);

c. the roof (10) having an underside surface with at least one track member (70) and the top (242) of the exterior rear wall (240) of the pop-out (200) having a corresponding track retaining mechanism (30) so that the track retaining mechanism (30) of the pop-out (200) slides relative to the track mechanism of the roof so that as the pop-out (200) is moved from the retracted condition to the extended condition, the roof (10) rotates about its hinge means (20) and is moved to a position over the top opening (270) of the pop-out (200) by the track retaining mechanism (60, 62, 64) sliding relative to the track (70) on the underside of the roof (10) until the roof (10) is in the fully extended condition over the pop-out (200), the combination track (70) and track retaining mechanism (60,62,64) serving to retain the roof (10) in its fully extended condition over the pop-out (200), and when the pop-out (200) is returned to its fully retracted position within the trailer (100), the combination track (70) and track retaining mechanism (60, 62, 64) enables the roof (10) to rotate in the opposite direction and rest over the exterior rear wall (240) of the retracted pop-out (200); and d. the at least one track mechanism on the underside of the roof (10) comprises an interior horizontal wall (72) on the underside of the roof (10), a first transverse sidewall (74) with an interiorly extending lower wall (73), a parallel oppositely disposed second transverse sidewall (76) with an interiorly extending lower wall (77) all of which surround a gap (78), and the track retaining mechanism on the pop-out (200) having a vertical tooth member (60) having spaced apart flanges (62,64), the flanges (62, 64) respectively retained in a transverse sidewall (74, 76) and lower interior extending wall (73, 77) within the gap (78).

2. The roof (10) in accordance with claim 1 wherein the roof (10) is made out of hard material selected from the group consisting of polyvinyl, fiberglass, steel, aluminum, and fiberboard.

3. The roof (10) in accordance with claim 1 further comprising a multiplicity of tracks (70) and mating track retaining mechanisms (60, 62, 64) at spaced apart locations on the roof (10) and the pop-out (200).

* * * * *